US012556457B2

(12) United States Patent
Vasseur et al.

(10) Patent No.: US 12,556,457 B2
(45) Date of Patent: Feb. 17, 2026

(54) RECOMMENDATION GROUPING FOR PREDICTIVE NETWORKING

(71) Applicant: Cisco Technology, Inc., San Jose, CA (US)

(72) Inventors: Jean-Philippe Vasseur, Combloux (FR); Grégory Mermoud, Venthône (CH); Pierre-André Savalle, Rueil-Malmaison (FR); Eduard Schornig, Haarlem (NL)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 18/124,851

(22) Filed: Mar. 22, 2023

(65) Prior Publication Data

US 2024/0323096 A1    Sep. 26, 2024

(51) Int. Cl.
*H04L 41/147*    (2022.01)
*H04L 41/16*    (2022.01)
*H04L 41/5025*    (2022.01)

(52) U.S. Cl.
CPC ............ *H04L 41/147* (2013.01); *H04L 41/16* (2013.01); *H04L 41/5025* (2013.01)

(58) Field of Classification Search
CPC ... H04L 41/147; H04L 41/16; H04L 41/5025; G06Q 10/0635
See application file for complete search history.

(56) References Cited

U.S. PATENT DOCUMENTS

| 10,389,836 | B2 | 8/2019 | Braud et al. |
| 10,958,553 | B2 | 3/2021 | Pant et al. |
| 2020/0136949 | A1* | 4/2020 | Pant .................... H04L 43/0876 |
| 2022/0045921 | A1 | 2/2022 | Balakrishnan et al. |
| 2022/0060391 | A1* | 2/2022 | Browne .............. H04L 41/0866 |
| 2022/0345394 | A1 | 10/2022 | Vasseur et al. |
| 2023/0261932 | A1* | 8/2023 | Seetharaman .......... H04L 41/40 709/223 |

FOREIGN PATENT DOCUMENTS

| CN | 107196871 A | 9/2017 |
| CN | 112565193 A | 3/2021 |

* cited by examiner

*Primary Examiner* — Lesa M Kennedy
(74) *Attorney, Agent, or Firm* — Lee & Hayes, P.C.

(57) ABSTRACT

In one embodiment, a device generates a plurality of recommendations for a network, each recommendation indicating a suggested action to optimize quality of experience of a corresponding application accessible via the network. The device assigns scores to different possible groupings of the plurality of recommendations. The device selects a particular grouping from among the plurality of recommendations, based on their scores. The device provides the particular grouping for implementation in the network.

20 Claims, 14 Drawing Sheets

700

💡 Recommendations ⓘ
Recommended actions
🔍 DCA　　　　　　　　　　　✕

┌─────────────────────────────────────┐
│ ⚛ SITE EC075B5DCA　　　　　 ☿       │
│   Anonymized > Anonymized           │
│ ─────────────────────────────────── │
│ Switch from public-internet     │
│ to biz-internet                 │
│ 　　　　　　　　　97%　+11%          │
│ Mar 31 04 AM　　　Recommended        │
│ ┌──────┐　　　　　Path Quality       │
│ │Ready │                             │
│ └──────┘                             │
└─────────────────────────────────────┘

┌─────────────────────────────────────┐
│ ⚛ SITE EC075B5DCA　　　　　 ▯       │
│   Anonymized > Anonymized           │
│ ─────────────────────────────────── │
│ Switch from public-internet     │
│ to biz-internet                 │
│ 　　　　　　　　　95%　+12%          │
│ Apr 01 04 AM　　　Recommended        │
│ ┌──────┐　　　　　Path Quality       │
│ │Ready │                             │
│ └──────┘                             │
└─────────────────────────────────────┘

┌─────────────────────────────────────┐
│ ⚛ SITE EC075B5DCA　　　　　 ☁       │
│   Anonymized > Anonymized           │
│ ─────────────────────────────────── │
│ Switch from public-internet     │
│ to biz-internet                 │
│ 　　　　　　　　　97%　+11%          │
│ Mar 31 04 AM　　　Recommended        │
│ ┌──────┐　　　　　Path Quality       │
│ │Ready │                             │
│ └──────┘                             │
└─────────────────────────────────────┘

┌─────────────────────────────────────┐
│ ⚛ SITE EC075B5DCA　　　　　 G       │
│   Anonymized > Anonymized           │
│ ─────────────────────────────────── │
│ Switch from public-internet     │
│ to biz-internet                 │
│ 　　　　　　　　　95%　+12%          │
│ Mar 31 04 AM　　　Recommended        │
│ ┌──────┐　　　　　Path Quality       │
│ │Ready │                             │
│ └──────┘                             │
└─────────────────────────────────────┘

💡 Recommendations ⓘ
Recommended actions
🔍 FCE　　　　　　　　　　　✕

┌─────────────────────────────────────┐
│ ⚛ SITE 240F6A5FCE　　　　　 ☿       │
│   Anonymized > Anonymized           │
│ ─────────────────────────────────── │
│ Switch from public-internet,    │
│ biz-internet to                 │
│ public-internet　96%　+5%       │
│ Jul 29 04 AM　　　Recommended        │
│ ┌──────┐　　　　　Path Quality       │
│ │Ready │                             │
│ └──────┘                             │
└─────────────────────────────────────┘

┌─────────────────────────────────────┐
│ ⚛ SITE 240F6A5FCE　　　　　 ▯       │
│   Anonymized > Anonymized           │
│ ─────────────────────────────────── │
│ Switch from public-internet,    │
│ biz-internet to                 │
│ public-internet　96%　+5%       │
│ Jul 29 04 AM　　　Recommended        │
│ ┌──────┐　　　　　Path Quality       │
│ │Ready │                             │
│ └──────┘                             │
└─────────────────────────────────────┘

┌─────────────────────────────────────┐
│ ⚛ SITE 240F6A5FCE　　　　　 ☁       │
│   Anonymized > Anonymized           │
│ ─────────────────────────────────── │
│ Switch from public-internet,    │
│ biz-internet to                 │
│ public-internet　96%　+5%       │
│ Jul 29 04 AM　　　Recommended        │
│ ┌──────┐　　　　　Path Quality       │
│ │Ready │                             │
│ └──────┘                             │
└─────────────────────────────────────┘

┌─────────────────────────────────────┐
│ ⚛ SITE 240F6A5FCE　　　　　 G       │
│   Anonymized > Anonymized           │
│ ─────────────────────────────────── │
│ Switch from public-internet,    │
│ biz-internet to                 │
│ public-internet　96%　+5%       │
│ Jul 29 04 AM　　　Recommended        │
│ ┌──────┐　　　　　Path Quality       │
│ │Ready │                             │
│ └──────┘                             │
└─────────────────────────────────────┘

FIG. 7B

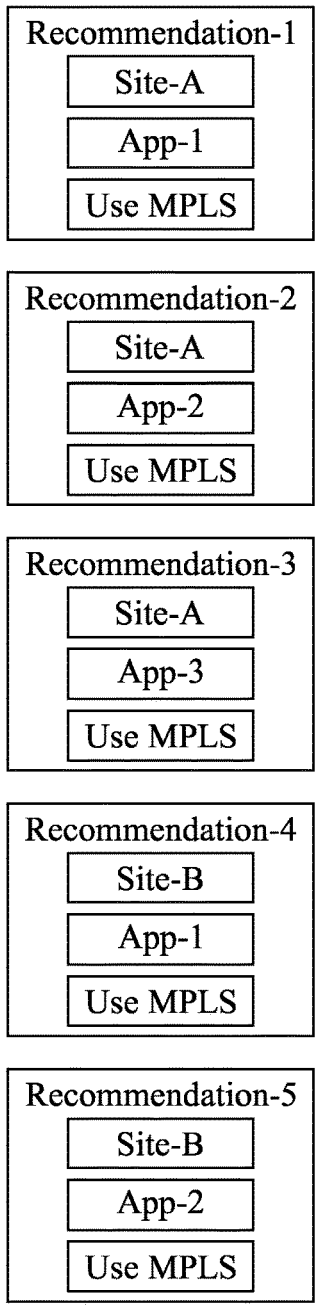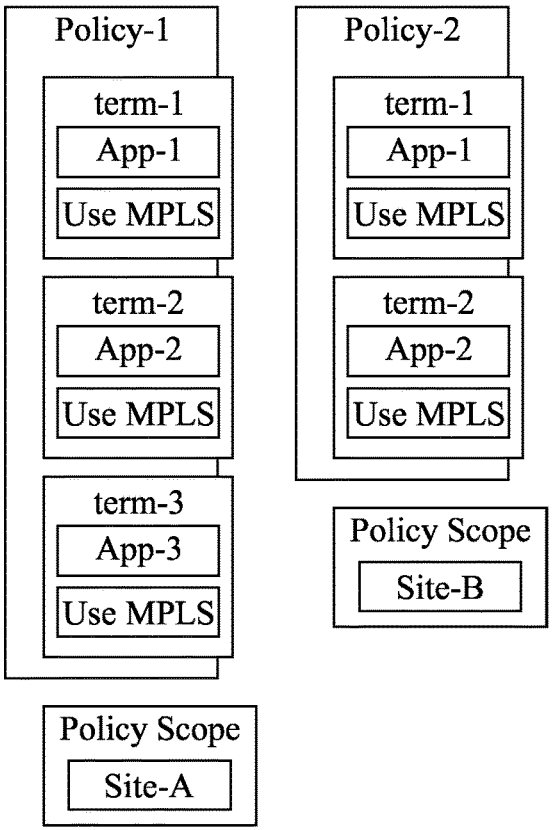
FIG. 8A
FIG. 8B

RECOMMENDATION GROUPING FOR PREDICTIVE NETWORKING

TECHNICAL FIELD

The present disclosure relates generally to computer networks, and, more particularly, to recommendation grouping for predictive networking.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QOS) requirements of the traffic (e.g., in terms of delay, jitter, packet loss, etc.).

With the recent evolution of machine learning, predictive networking in an SDN/SD-WAN, as well as other forms networks, now becomes possible. Generally, predictive networking represents an evolution over traditional networking approaches, which were reactive in nature and relied on the detection of an actual failure in the network before initiating corrective measures (e.g., rerouting traffic onto another path). In contrast, predictive networking seeks to predict failures before they actually occur, so that corrective measures can be taken in advance.

While predictive networking is quite promising, the number of applications, paths, and endpoints in a typical network can lead to a predictive networking system generating an overwhelming number of recommended actions. This may overwhelm a network administrator or lead to high resource usage by a network controller. In addition, any such recommendation is not without risk, as changing the configuration of the network is not without risk of negatively impacting the traffic in the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7B illustrate example groupings of recommendations;

FIGS. 8A-8D illustrate different groupings for a set of recommendations;

DESCRIPTION OF EXAMPLE EMBODIMENTS

Overview

Figure 1A:
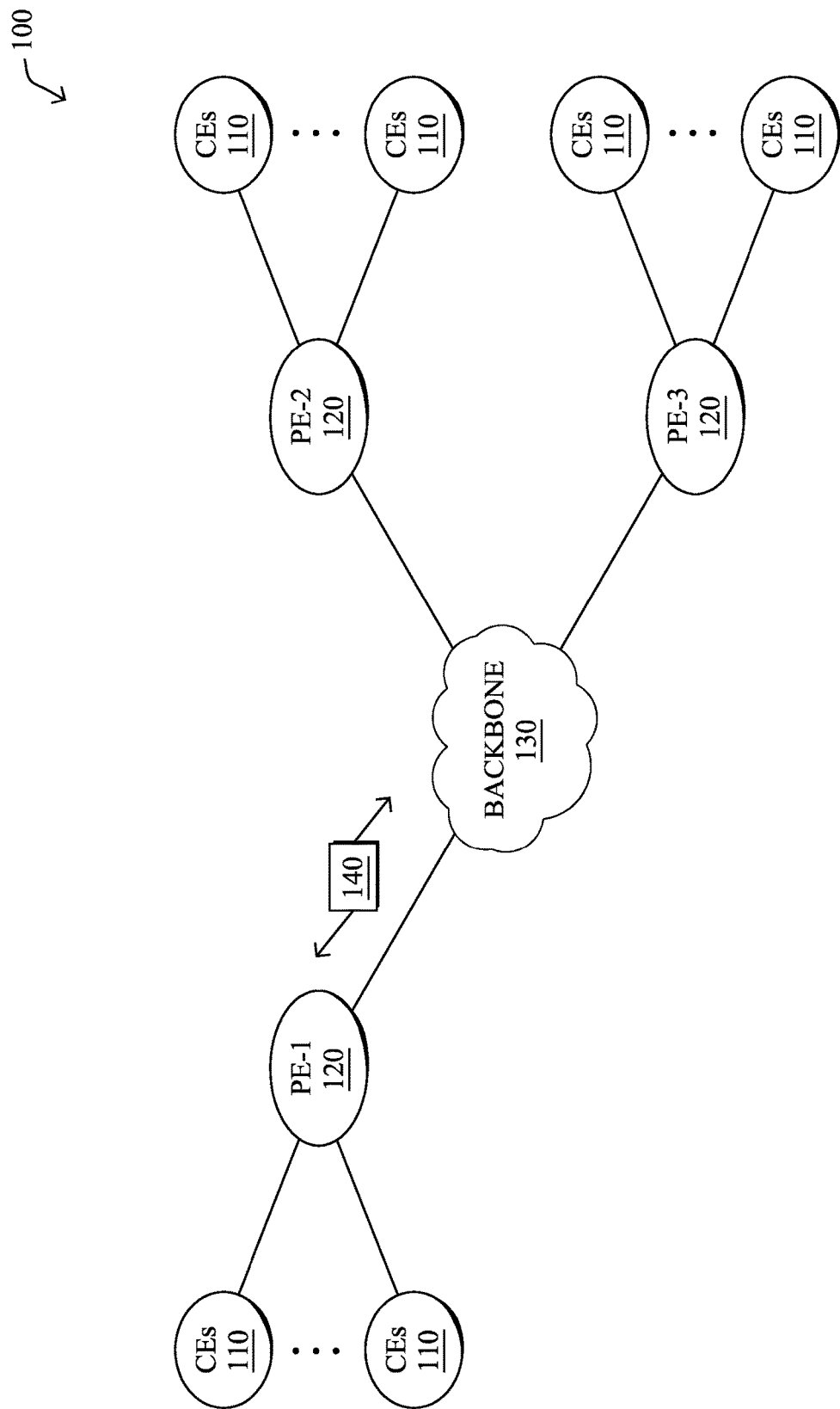
FIGS. 1A-1B illustrate an example communication network.

According to one or more embodiments of the disclosure, a device generates a plurality of recommendations for a network, each recommendation indicating a suggested action to optimize quality of experience of a corresponding application accessible via the network. The device assigns scores to different possible groupings of the plurality of recommendations. The device selects a particular grouping from among the plurality of recommendations, based on their scores. The device provides the particular grouping for implementation in the network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
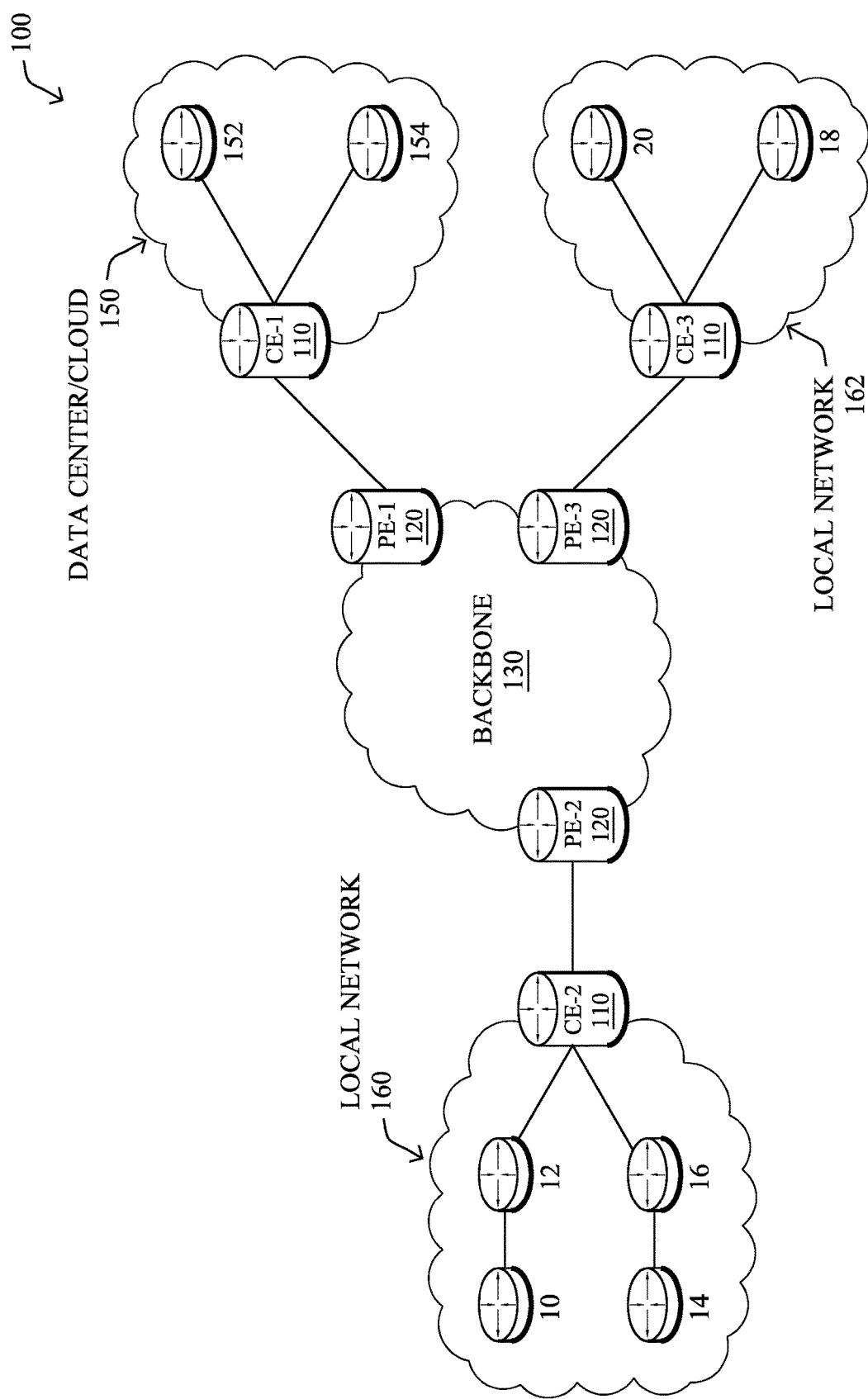

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
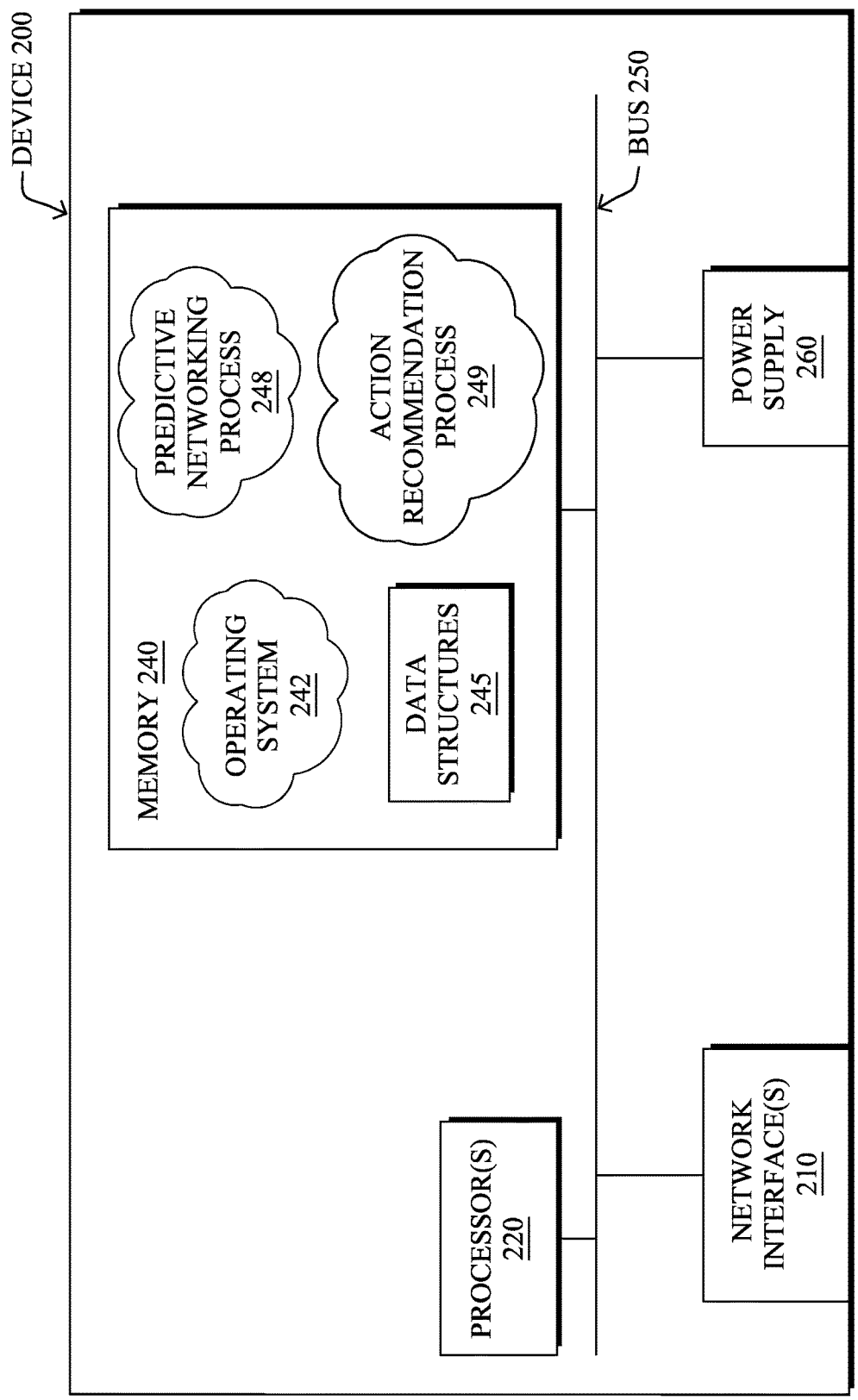
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive networking process 248 and/or action recommendation process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, predictive networking process 248 and/or action recommendation process 249 may include computer executable instructions that, when executed by processor(s) 220, cause device 200 to perform the techniques described herein. To do so, in some embodiments, predictive networking process 248 and/or action recommendation process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive networking process 248 and/or action recommendation process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive networking process 248 and/or a recommendation policy manager process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
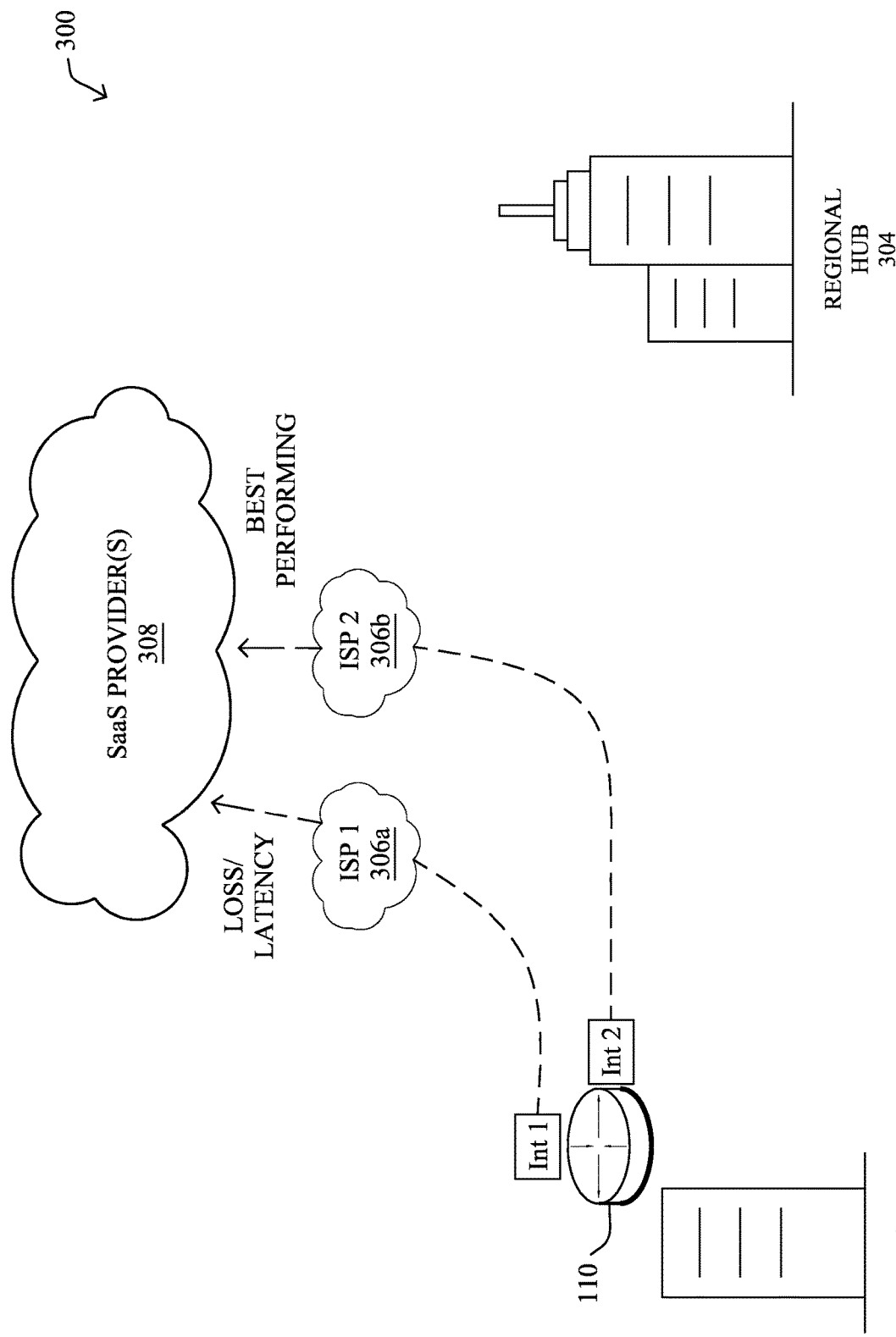
FIGS. 3A-3B illustrate example network deployments.
Figure 3B:
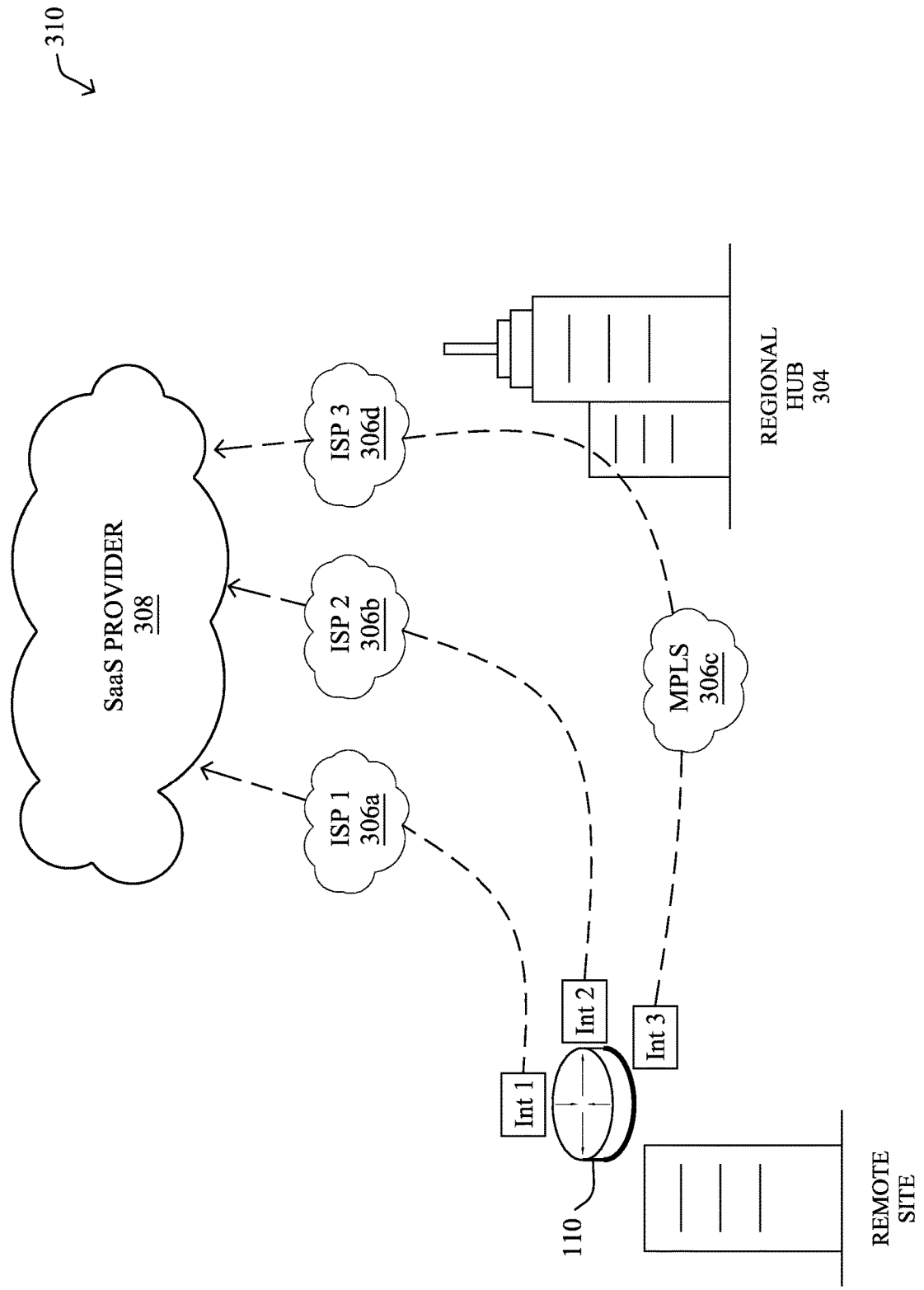

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL. 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
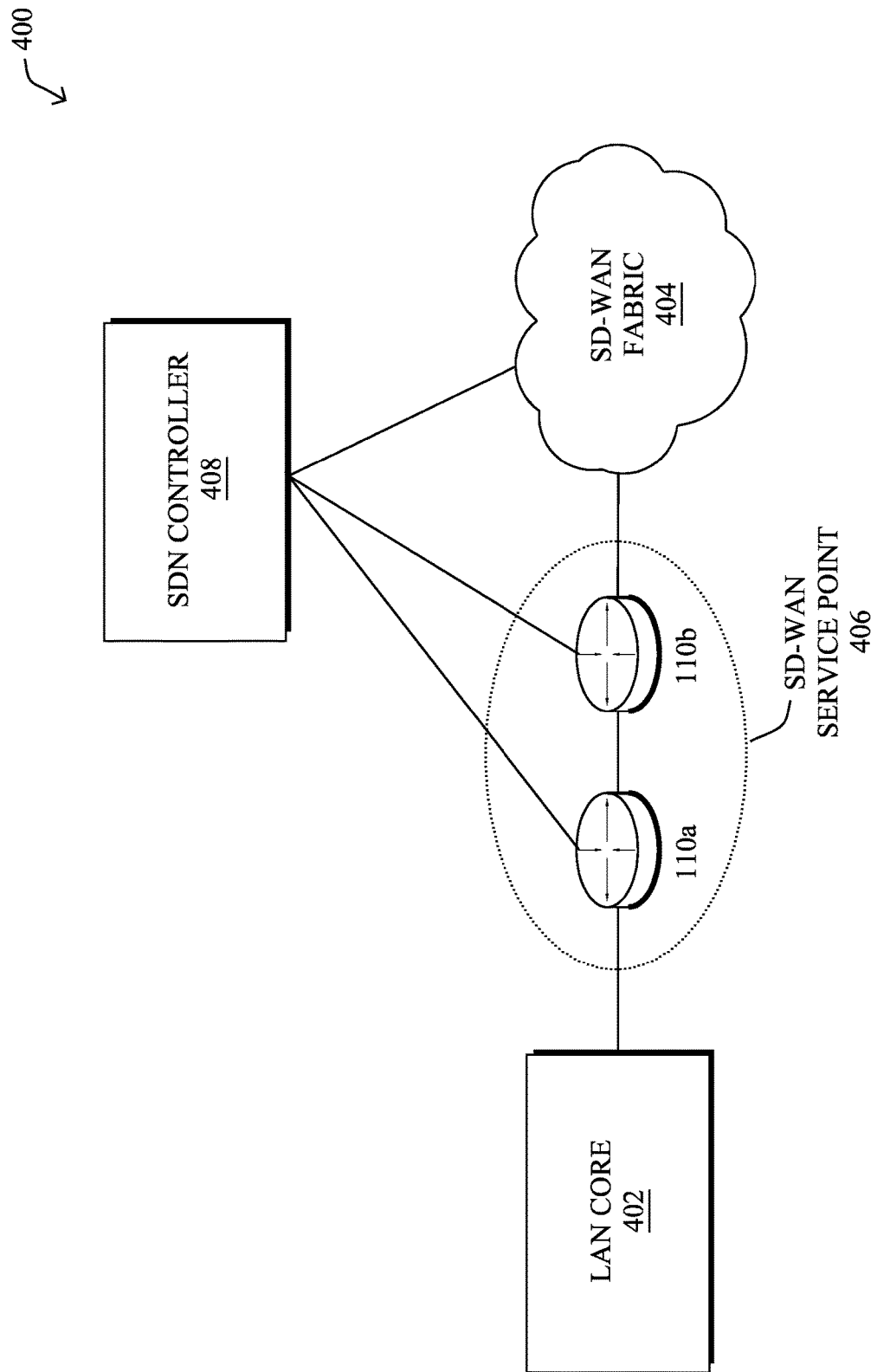
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing. CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
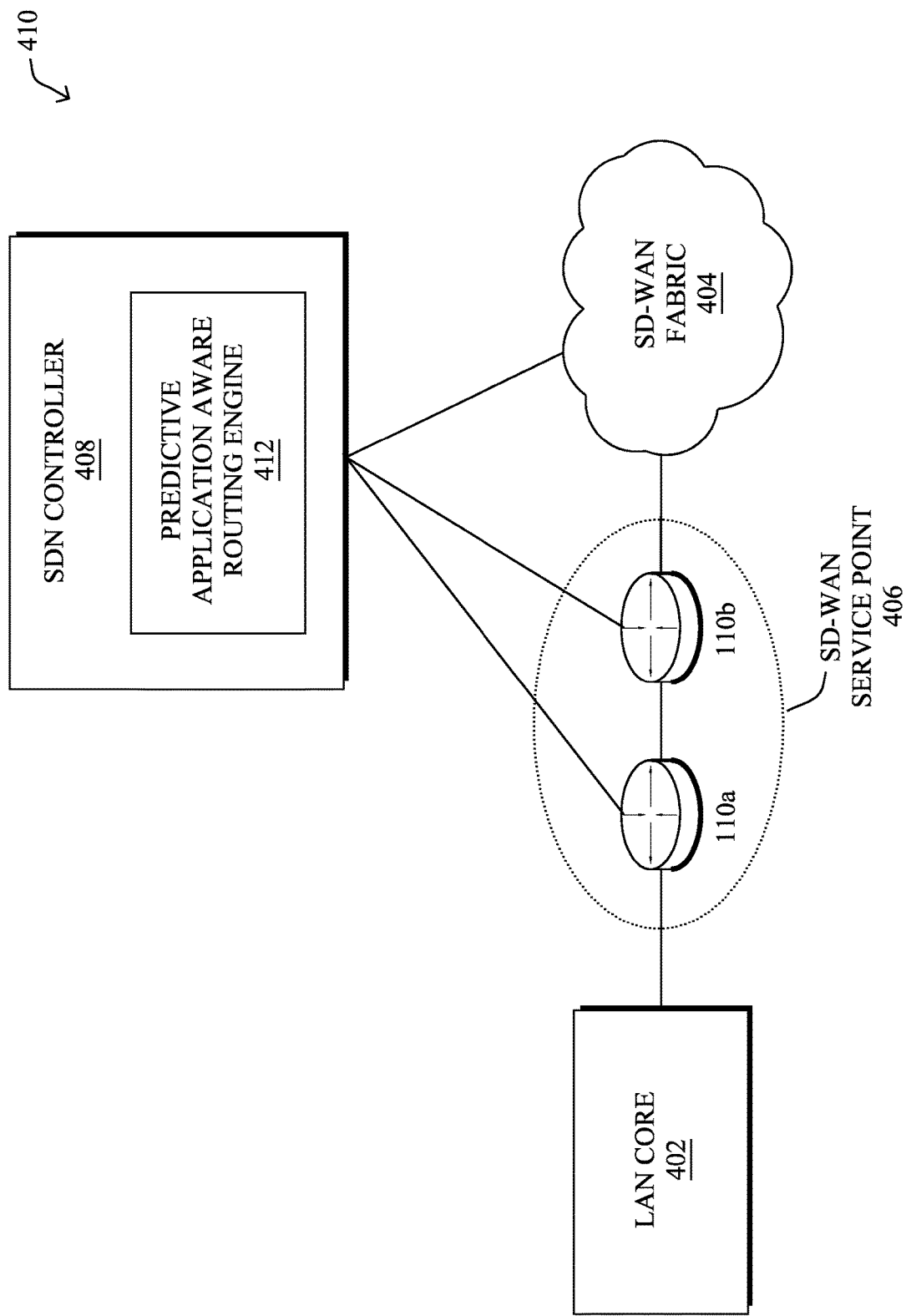

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive networking process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches." which are typically temporary in nature (e.g., active for a specified period of time) and may also be application-specific (e.g., for traffic of one or more specified applications).

In more advanced embodiments, predictive application aware routing engine 412 may predict the QoE of a given application through any or all of the following:

Obtaining user feedback directly from the application. For instance, users of the application may provide ratings, satisfaction surveys, or the like, which predictive application aware routing engine 412 could access via an application programming interface (API) of the application Applying traffic analytics, such as by analyzing Netflow records that include extra metrics like Application Response Time (ART).

Sending synthetic path probes to measure networking metrics to each SaaS application from each location. These probes are 'synthetic' in that they seek to mimic the actual characteristics of the traffic of the application under scrutiny.

As noted above, while predictive networking is quite promising to ensure acceptable QoE of an online application, the large number of endpoints, network paths, and applications can lead to a very large number of recommended actions (e.g., traffic reroutes or other reconfigurations of the network). While these actions could be implemented automatically, in some embodiments, many network administrators are also hesitant to allow the system to operate without any human input. Conversely, though, having an administrator review each and every recommendation by the system could also be extremely cumbersome. In addition, the recommended actions are not without risk of actually having a negative effect on the network, which could be pertinent information to a network administrator when deciding whether or not to approve a recommended action.

——Recommendation Grouping for Predictive Networking——

The techniques herein allow for grouping of recommendations from a predictive networking system, in order to reduce the number of configuration changes in the network (and thus the operational risk when applying changes and overall configuration complexity). In some aspects, the recommendation engine considers the type of recommendations, the nature of the recommendations (e.g., potential impact on user traffic or not), and/or their past efficacy (e.g., using an on-line monitoring approach to assess the potential negative impact of grouping), to apply different strategies (e.g., batch or real-time), accordingly. Further aspects of the techniques herein relate to the computation of the risk/impact of a (set of) recommendation(s). Such a risk score can then be used by a user or automation system to determine when recommendations should be applied/enforced. In another aspect, the system may also take into accounts the nature of the recommendation (e.g., whether it impacts traffic, etc.), the network resources involved (e.g., amount of traffic, users, level of centrality, etc.) should everything goes as planned or not, when computing the risk score. In addition, the system may also evaluate how the risk varies over time, to minimize the risk while still monitoring the risk after the recommendation is applied.

Illustratively, the techniques described herein may be performed by hardware, software, and/or firmware, such as in accordance with action recommendation process 249, which may include computer executable instructions executed by the processor 220 (or independent processor of interfaces 210) to perform functions relating to the techniques described herein, in conjunction with predictive networking process 248.

Specifically, according to various embodiments, a device generates a plurality of recommendations for a network, each recommendation indicating a suggested action to optimize quality of experience of a corresponding application accessible via the network. The device assigns scores to different possible groupings of the plurality of recommendations. The device selects a particular grouping from among the plurality of recommendations, based on their scores. The device provides the particular grouping for implementation in the network.

Figure 5:
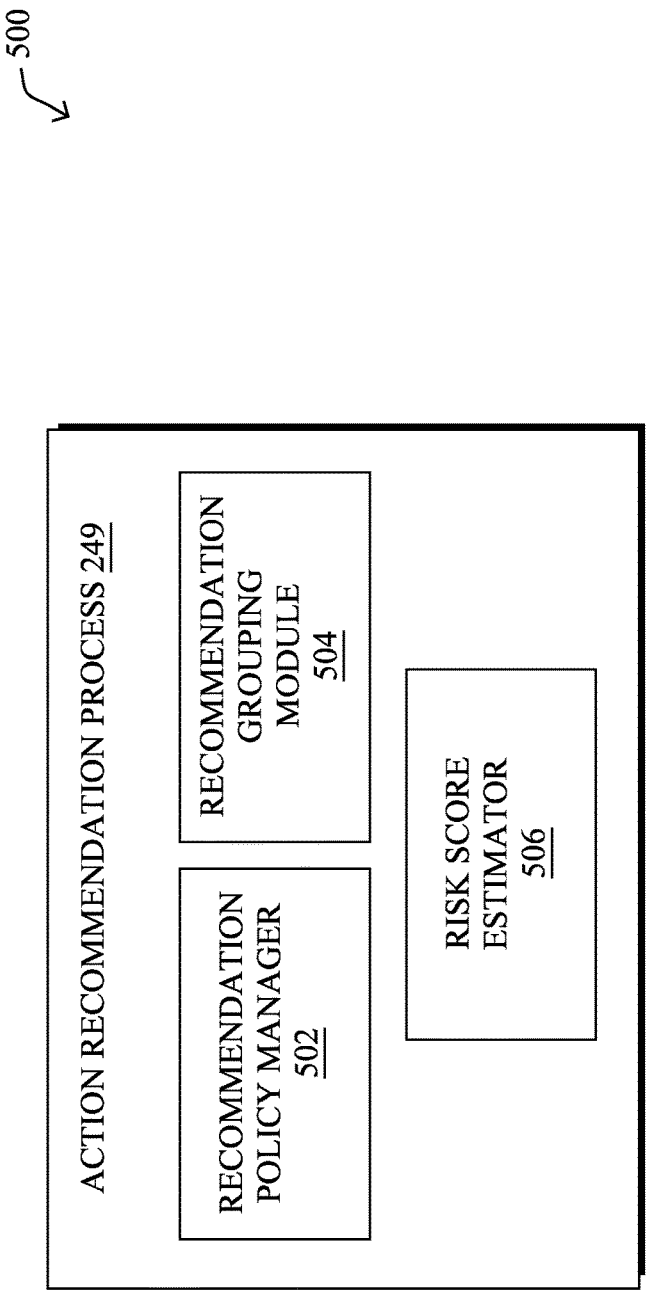
FIG. 5 illustrates an example architecture for recommendation grouping for predictive networking.

Operationally, FIG. 5 illustrates an example architecture for recommendation grouping for predictive networking, according to various embodiments. At the core of architecture 500 is action recommendation process 249, which may be executed by a controller for a network or another device in communication therewith. For instance, action recommendation process 249 may be executed by a controller for a network (e.g., SDN controller 408 in FIGS. 4A-4B), a particular networking device in the network (e.g., a router, etc.), another device or service in communication therewith, or the like, to provide a supervisory service to the network. More specifically, action recommendation process 249 may operate in conjunction with a predictive application aware routing engine (e.g., that through execution of predictive networking process 248), such as predictive application aware routing engine 412, or directly implemented as a component thereof, in some embodiments.

As shown, action recommendation process 249 may include any or all of the following components: a recommendation policy manager 502, a recommendation grouping module 504, and/or a risk score estimator 506. As would be appreciated, the functionalities of these components may be combined or omitted, as desired. In addition, these components may be implemented on a singular device or in a distributed manner, in which case the combination of executing devices can be viewed as their own singular device for purposes of executing action recommendation process 249.

As described previously, predictive networking process 248 may generate what are referred to herein as recommendations that suggest actions (e.g., a configuration change) to avoid an undesirable event that was predicted, such as a network failure, degradation of application experience/QoE, etc. In this context, "predictions" and "recommendations" may be viewed interchangeably to denote outputs of predictive networking process 248. Note also that recommendations and predictions from predictive networking process 248 may have various forecasting horizons, as well: long term (e.g., prediction of issues along a given path several weeks/months ahead), short term (e.g., prediction of issues that may take place in the next day, hours, etc.) or even in (near-) real-time (e.g., prediction of issues a few seconds ahead).

In some embodiments, predictive networking process 248 may also compute a confidence metric associated with any of its recommendations/predictions. For instance, predictive networking process 248 may use a regression model to compute the probability of SLA violation or QoE metric along one or more network paths. The level of confidence of the system for any given recommendation may be governed by the output of the model.

As would be appreciated, the impact/risk for any given recommendation by predictive networking process 248 relates to the potential consequences that any given recommendation can have on the network. For instance, a recommendation by predictive networking process 248 that triggers a change to the forwarding plane on a router may have different consequence than optimizing the response time of control information. As another example, applying a routing change on a site with a few dozen users using Office 365 is not comparable with applying the same change to a large production site with thousands of machines running critical applications. Thus, the impact/risk is a critical factor to a network operator when determining whether or not to apply recommendations by predictive networking process 248 automatically and/or manually.

Figure 6:
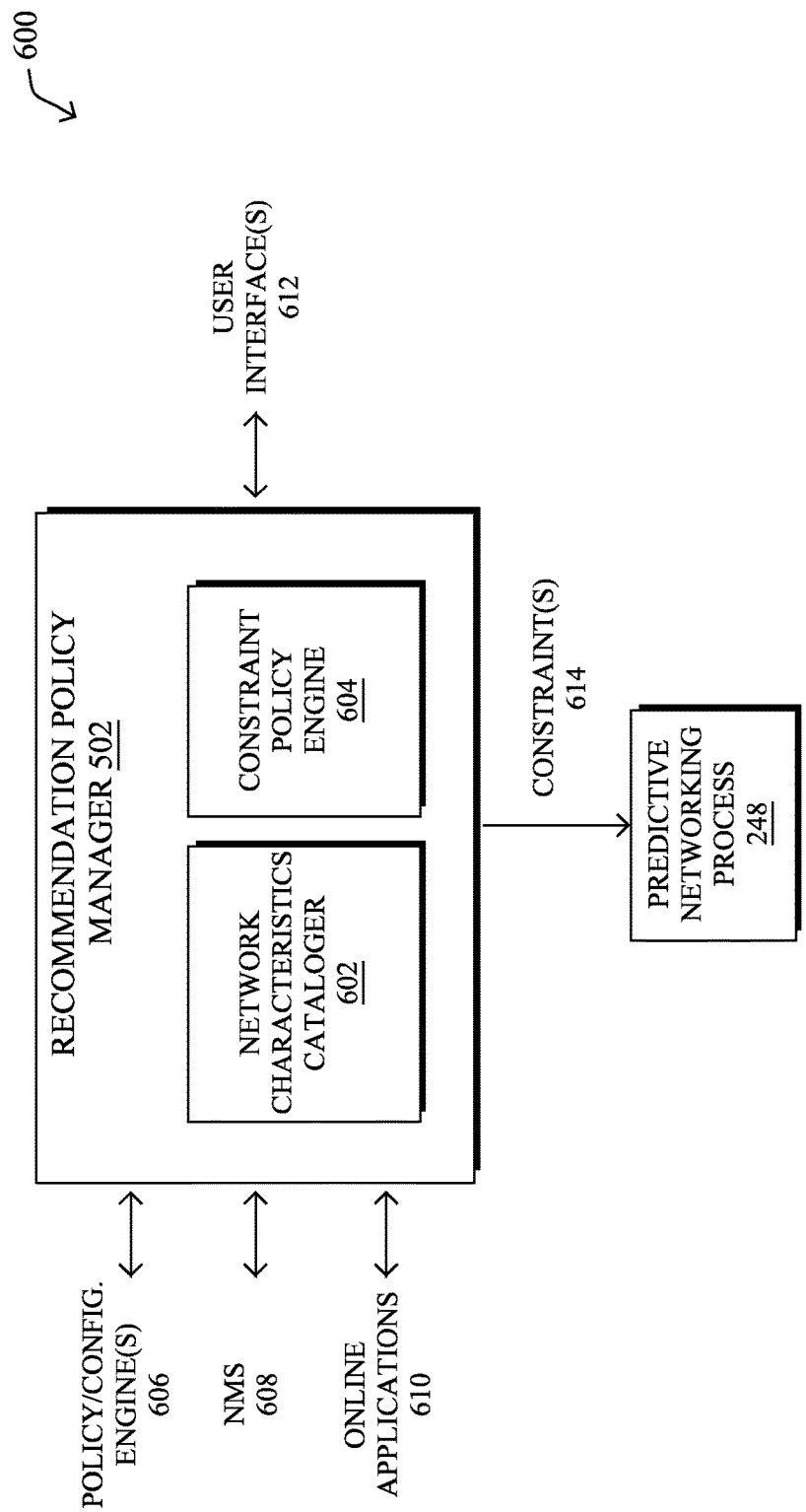
FIG. 6 illustrates an example architecture for a recommendation policy manager for predictive networking.

FIG. 6 illustrates an example architecture 600 for recommendation policy manager 502, according to various embodiments. As shown, recommendation policy manager 502 may include a network characteristics cataloger 602 and constraint policy engine 604.

According to various embodiments, network characteristics cataloger 602 may be configured to obtain a plurality of characteristics of different portions of the network. In some cases, network characteristics cataloger 602 may do so on a pull basis, whereby network characteristics cataloger 602 first requests the relevant characteristic information. In further cases, network characteristics cataloger 602 may do so on a push basis, whereby characteristic information is provided to network characteristics cataloger 602 without it first requesting such information (e.g., reported periodically, in response to a change in the information, etc.).

In some embodiments, network characteristics cataloger 602 may obtain characteristic information about the different portions of the network via application programming interfaces (APIs) with any number of network policy and/or configuration engines 606 associated with the network. For instance, vManage represents one such possible engine from which the network characteristic information may be obtained. An SDN controller represents another such source. In various embodiments, different network characteristics (dimensions) may be obtained from the configuration, policy, and/or inventory data stored by engines 606 such as any or all of the following for a given portion of the network:

- The geolocations of that portion of the network
- WAN circuits in use: MPLS, Internet, LTE, etc.
- WAN circuit capacity (when defined)
- The role of the portion of the network: this could specify, for instance, functional site roles such as spoke and hub, datacenter, cloud, etc., which could be determined by analyzing the fabric configuration. In addition, custom tagging or grouping may be in place to assign different roles such as factories, stores, back-offices, etc.
- Hardware configuration: e.g., physical device models, cloud instances or on prem virtualized appliances.
- Redundancy strategy: e.g., number of circuits used and whether the site is configured as single or dual CPE.
- Internet Breakout type: e.g., centralized (via DC or HUB), direct Internet access (DIA) using local connections, secure internet gateway (SIG) via cloud security provider (CSP) like umbrella or zScaler, etc.

Using the data above collected by network characteristics cataloger 602 to provide information to user interface(s) 612, a network administrator could visualize the scope of individual or groups of recommendations to their specific network domain. As described in further detail below, this information may also be made available by network characteristics cataloger 602 to components such as constraint policy engine 604, to create constraint(s) 614 for predictive networking process 248 that restrict recommendations by predictive networking process 248 for selected portions of the network.

In some embodiments, network characteristics cataloger 602 may also obtain further characteristic information from a network management system (NMS) 608, such as via one or more APIs. This additional information may take the form of additional statistics (e.g., average/min/max/percentile) related to the use of the network, such as the estimated number of users per portion of the network (e.g., sites, etc.), link utilizations (per link type), number of incidents logged per-site (e.g., using a customer relations management system such as a Salesforce), or other characteristic information. These types of information could also be provided by network characteristics cataloger 602 via user interface(s) 612 and be pertinent to a network operator to determine the level of sensitivity of specific sites or other portions of the network for which predictive recommendations are being made. For instance, a network operator may decide to restrict predictive networking process 248 from implementing automatic recommendations for a site with a high number of users, high link utilizations, and that experienced a high number of critical cases/support incidents reported by users.

Another potential source of characteristic information obtained by network characteristics cataloger 602 may be the online applications 610 accessed by users of the network. For instance, such characteristic information may include user satisfaction survey data, mean opinion score (MOS) information, user information, or the like. Any or all of this information could also be provided by 502 for review via user interface(s) 612.

According to various embodiments, constraint policy engine 604 may be configured to allow network administrators to define constraints for predictive networking process 248 via user interface(s) 612 that limit recommendations by predictive networking process 248. For instance, such constraints may specify any or all of the following constraints, among others:

Geography: continent, country, region, or city
Site Type: hub, branch, DC, cloud, factory
Recommended action
WAN circuit type or ISP
Site ID List: a list of site IDs that should be excluded or included
Application or application group
Number of Users: number of users for a particular application or site
Performance Indicators: e.g., networking KPIs (delay, loss, jitter) coming from controllers (such as vAnalytics or ThousandEyes), and application-level systems (such as the Webex monitoring engine). Such an indication may be used by the user to decide whether a policy should be configured for a given site (e.g., sites at risk because already
Forecasted Improvement:
  Quality Improvement (as %)
  Number of users impacted or helped
Max number of times unsuccessful recommendations: as recommendations are applied, this number counts the number of those that have been unsuccessful and stop applying recommendations where the threshold is crossed.
Network operator preferences: companies may have very different strategies with regards to predictive networks and automation. Some companies are highly risk adverse (e.g., number of changes should be minimized, changes cannot be applied within specific periods— e.g., holiday season for retailers, 8:00 AM through 5:00 PM for trading, etc.). For instance, constraint policy engine 604 may be configured to indicate different user objectives as possible constraints via user interface(s) 612:
Minimize impact/risk (lower risk of applying a given recommendation)
Minimize changes in the network (try to reduce the number of recommendations applied with Automation to avoid fragmenting the configuration policies)
Etc.

Said differently, recommendation policy manager process 249 may use network characteristics cataloger 602 to obtain characteristics of different portions of the network and present them to a network administrator via user interface(s) 612. Doing so allows the administrator greater insight into the different portions of the network (e.g., sites, data centers, factories, clouds, etc.) and make an assessment as to the risks and rewards associated with using predictive networking process 248 to make recommendations for them. In turn, recommendation policy manager process 249 may also use constraint policy engine 604 to allow the administrator to define, via user interface(s) 612, any number of constraint(s) 614 that limit the recommendations by predictive networking process 248, accordingly.

In various embodiments, constraint policy engine 604 may then configure predictive networking process 248 with constraint(s) 614, so as to prevent it from generating recommendations for any of their corresponding portions of the network, accordingly. This can be achieved by predictive networking process 248 in a number of ways such as by filtering out prediction for portions of the network having characteristics that match constraint(s) 614, preventing its prediction model from even making predictions for portions of the network having characteristics that match constraint(s) 614, preventing predictive networking process 248 from automatically implementing recommendations for portions of the network having characteristics that match constraint(s) 614, or the like.

Referring again to FIG. 5, recommendation grouping module 504 may work in conjunction with recommendation policy manager 502 to consolidate its recommendations. To do so, recommendation grouping module 504 may leverage a custom API to retrieve existing network configurations (e.g., by interacting with the SD-WAN controller vManage, the individual networking devices, or the like). In addition, recommendation grouping module 504 may also receive the recommendations from recommendation policy manager 502 or directly from predictive networking process 248, if no such filtering is performed. In turn, recommendation grouping module 504 may output a new set of grouped recommendations, which it can then provide to a user interface for review or back to predictive networking process 248 for implementation.

In various embodiments, recommendation grouping module 504 may employ different types of grouping strategies, such as the following:

A merge recommendation is a recommendation built out of a set of recommendations with similar criterion. For example, recommendation grouping module 504 may group a set of ten recommendations for different applications, but the same router pointing to the same connectivity change (e.g., switch from MPLS to biz-internet), together into a single policy term that uses a match criterion composed of the ten applications and a single action corresponding to the suggested change such that all ten recommendations are implemented using a single change.

A generalization recommendation is a recommendation that generalizes upon one or more recommendations to produce a single, simpler recommendation. For example, the same routing change recommendation might apply to N-number of specific subnets. In such a case, recommendation grouping module 504 may summarize the N subnets using a single, "larger" subnet. Note that such groupings may have undesirable effects as they can end up applying a recommendation to a broader set of traffic than initially intended. For example, this may lead to routing more traffic to an alternate than the traffic destined to the more specific subnet.

In various embodiments, recommendation grouping module 504 may use any number of approaches to generate the groupings, such has integer linear/quadratic binary programming. For instance, the following simplified example illustrates one potential approach with a quadratic objective function. To this end, a recommendation consists of:

An entity to which the configuration change should be applied. An entity can be a router, a group of routers, a site, etc. For simplicity, it can be assumed that input recommendations all have a router as entity.

A criterion to apply to the configuration.

An action to apply.

In turn, recommendation grouping module 504 may represent each recommendation as a vector $r^k$ with K-number of binary entries. For instance, applying a change with respect to Webex as par of the criterion can be indicated by a '1' in the first position, while applying a change with respect to SharePoint can be indicated by a '1' in the second position, etc. This allows recommendation grouping module 504 to cast the problem as an integer problem by introducing:

Binary variables ($r_i^k$), 1≤i≤N, 1≤k≤K describing up to N grouped recommendations over K possible configuration changes. Some of those grouped recommendations can also be empty (e.g., they are all zeroes corresponding to no entity, no criterion, and no action).

An objective function seeking to favor a small number of non-empty grouped recommendations with a small number of criteria and actions. A quadratic objective can be used to promote such groups.

A set of constraints that the grouped recommendations at least cover the input recommendations. The vector with K binary entries may then be denoted by t=($t^k$, 1≤k≤K) corresponding to all of the configuration changes in the individual N input recommendation. Then, the entry-wise vector constraint $\sum_{i=1}^{N} r_i \geq t$ can be imposed. The grouped recommendations can be more general, as in the case of a generalization recommendation. If a slightly more general recommendation can be expressed using a single criterion and covers many individual input recommendations, then the objective function may favor it.

The overall binary programming program can then be represented as follows:

$$\max_{r_i^k} \sum_{i=1}^{N} \left( \sum_{k=1}^{K} r_i^k \right)^2 \text{ s.t.} \quad (1)$$

$$r_i^k \in \{0, 1\}$$

$$\forall k, 1 \leq k \leq K: \sum_{i=1}^{N} r_i^k = t^k \quad (2)$$

In some embodiments, the program can also be refined by weighting configuration changes, etc. In particular, the objective function may take into account whether applying a given configuration change has an impact on traffic forwarding, or on a general notion of risk for a given configuration change as computed by risk score estimator 506 and detailed further below. As an example, high-end routers do support configuration updates with no impact on traffic forwarding whereas such capability may not be supported on lower platforms. In some cases, though, even on high end routers there are changes that do have impact on traffic forwarding (and thus users). Recommendation grouping module 504 may take such recommendation attributes into account when considering grouping so as to favor grouping recommendations that have no impact on the user traffic. Note that reducing the number of changes is still always desirable to avoid configuration fragmentation.

FIGS. 7A-7B illustrate example groupings of recommendations 700 and 710, respectively. As shown, each grouping may include those recommendations that share the same site and action type (e.g., switch from connectivity option A to B, etc.) and can be merged to reduce the number of individual changes in the network from eight to just two.

In one embodiment, the objective function may include a penalty for producing a generalization recommendation that includes too much additional traffic compared to the original input recommendations. In the example of grouping similar recommendations for different individual subnets, recommendation grouping module 504 may retrieve the amount of traffic (e.g., in bytes, flows, user application sessions, etc.) destined to the set of smaller individual subnets and the new (grouped) large subnet and use it as a penalty in the objective function of its integer linear program.

In one embodiment, recommendation grouping module 504 may also report the corresponding values to the user for the output groupings, allowing the user to assess the benefits and risks of grouping subnets other combinations of recommended actions. In turn, the user may provide feedback as to whether such grouping strategies should be considered by recommendation grouping module 504.

As would be appreciated, a common challenge with using a predictive networking system can arise from excessive policy fragmentation. Policy fragmentation occurs when, as a result of applying individual recommendations to the network, a single or small number of initial generalized policies gradually become split (fragmented) into many localized policies with very narrow scopes. This can be even to the extreme of one policy per network entity (e.g., site, router, host). When left unchecked, excessive fragmentation can result in increased operational complexity and, in large networks, it can also lead to resource exhaustion and should be avoided.

Accordingly, in further embodiments, recommendation grouping module 504 may also compute a policy fragmentation score (PFS) for each potential recommendation grouping by comparing the number of policy elements (new policies, policy terms, prefix lists, site lists, etc.) required before and prior to implementing the recommendation group. Recommendation grouping module 504 may also assign different weights to distinct types of policy elements in the overall score calculation, based on the introduced complexity. Indeed, the addition of an entirely new policy is more complicated than adding a policy term into an existing policy or simply extending a prefix list.

In one embodiment, recommendation grouping module 504 may calculate the PFS as follows:

$$PFS = \frac{(npc \cdot pw + ntc \cdot tw)}{(cpc \cdot pw + ctc \cdot tw)}$$

where npc is the total number of new policies to be created as applying the recommendations, ntc, is the total number of new policy terms to be created across all new policies, cpc is the total number of policies already configured on the system, ctc is the total number of policy terms already configured on the system, pw is the weight of each individual policy element in the overall score, and tw is the weight of each individual policy term element in the overall score.

Figure 8D:
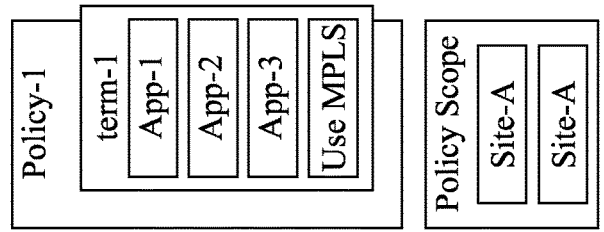

To better illustrate such an evaluation, FIGS. 8A-8D illustrate different groupings for a set of recommendations, in various embodiments. As shown in FIG. 8A, assume that an existing policy configuration already on the target network that includes three policies, each with five term. In such a case, pw=5 and tw=1, using the above equation. Now, assume that there is a set 800 of new recommendations, as shown in FIG. 8A.

Using different grouping strategies, recommendation grouping module 504 may arrive at three potential options to apply the recommendations to the network controller, each leading to a different PFS:

A first option 810 shown in FIG. 8B whereby recommendation grouping module 504 does not perform any grouping, resulting in the the creation of two new policies and five new policy terms with an associated PFS score of 0.5.

Figure 8C:
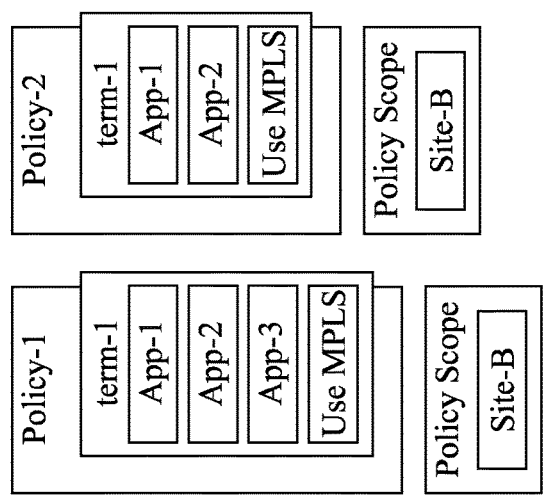

A second option 820 shown in FIG. 8C whereby recommendation grouping module 504 uses a merge operation on the five recommendations, resulting in the creation of two new policies and two new policy terms with an associated PFS score of 0.4.

A third option 830 shown in FIG. 8D whereby recommendation grouping module 504 uses a generalization operation on the five recommendations, resulting in the creation of a single new policy and one new policy with an associated PFS score of 0.2

In one embodiment, the objective function of recommendation grouping module 504 could also take into account the PFS values, to penalize recommendation groupings that have a high score and may result in excessively complicated policy configuration. In another embodiment, recommendation grouping module 504 may decide between using realtime versus batching strategies. In the former, recommendation grouping module 504 may process recommendations on-the-fly, trying to evaluate which recommendations could be grouped. In the latter, recommendation grouping module 504 may batch recommendations before being implemented, to optimize the grouping process. For instance, recommendation grouping module 504 may take into account the forecasting horizon (period of time before the occurrence of the prediction) to bound to batching processing time. By way of example, upon receiving a recommendation (e.g., change path A for path B for traffic class C in 5 hours), recommendation grouping module 504 may wait for some time (e.g., x hours) should it receive other recommendations that could be grouped, before triggering the grouping process.

In yet another embodiment, recommendation grouping module 504 may keep track of previous groupings and their relative efficacy to evaluate whether similar grouping should be evaluated. As pointed out previously, some grouping may have undesirable effects (e.g., affecting more traffic than with a larger number of recommendations with smaller scopes). To this end, recommendation grouping module 504 may also keep track of previous grouping along with their outcomes. In the case of subnet grouping, for instance, recommendation grouping module 504 may record that such a grouping allowed for reducing the number of changes by x %, while applying to more traffic than expecting (due to the grouping) but such "extra" traffic had experienced a similar QoE than before, or even better. In contrast, recommendation grouping module 504 may also track unsuccessful grouping and disable such grouping strategies in the future.

Referring again to FIG. 5, risk score estimator 506 may be responsible for calculating a risk score associated with a set of recommendations, according to various embodiments. Such a risk score could then be leveraged by the prediction system (e.g., predictive networking process 248), other components of action recommendation process 249, and/or provided to a user interface for review. As a reminder, the notion of risk relates to the impact that applying a recommendation can have on the network, not the confidence that the prediction is correct. Network operators may opt not to apply a recommendation with high confidence and high-risk score. Conversely, a recommendation with low confidence and low risk may be deemed acceptable.

The risk score can take various forms, such as a continuous value between 0 and 1 or roughly quantized into a few categories (e.g., Low, Medium, High, where High means a significant disruption of the network). In some embodiments, risk score estimator 506 may compute a risk score for each recommendation in isolation or, if multiple recommendations are to be applied at the same time, risk score estimator 506 may compute a risk score on the group of recommendations, as applying two recommendations at the same time can have higher risk, even if both recommendations have low risks in isolation.

In various embodiments, risk score estimator 506 may take into account how different the new configuration, after applying the recommendation, would be from the previous or past network configuration(s). For instance, enabling new features or types or queues or links might yield more risk if it has not been done before. To this end, risk score estimator 506 may leverage subject matter expertise and/or statistical techniques to build a notion of distance between a new configuration to a set of previously applied configurations as follows:

For each network device $D_k$, $1 \leq k \leq K$, build a feature vector $f_k$ representing the configuration of the network device. Risk score estimator 506 could use one-hot-encoding to encode categorical variables into binary variables and encode numerical values as-is. The state of the network at any given point in time can then be represented by a collection $\{f_1, \ldots, f_k\}$ of such binary feature vectors. Note that there can be two identical feature vectors in the collection if network devices are configured the same way, as their precise identity is not considered. Risk score estimator 506 may then maintain a database of such states with horizon T. The state at time t: $1 \leq t \leq T$ can be denoted by $F^t = \{f_k^t, 1 \leq k \leq K\}$.

For a set of recommendations $\{R_1, \ldots, R_n\}$, risk score estimator 506 may also build a similar feature vector $t_k$ for each network device $D_k$, $1 \leq k \leq K$, corresponding to the state after applying the configuration change(s) in the set of recommendation(s). The distance between the target state of the network and base state is then defined as the average distance between each recommendation feature and the following:

$$\frac{1}{TK}\sum_{t=1}^{T}\sum_{k=1}^{K}d(f_k^t, t_k)$$

where d(f,t) is a distance between two feature vectors. Risk score estimator 506 may build such a distance by combining a binary-aware distance (e.g., Hamming distance) over the binary entries of the feature vectors with a distance between continuous-valued vectors over the continuous entries on the feature vectors.

In another embodiment, risk score estimator 506 could also learn the distance function. That is, instead of using a standard distance function such as Hamming, Euclidean, or Manhattan, it could instead train a machine learning model that takes as input both f and t and outputs a measure of (dis)similarity. This can be achieved by learning from previous recommendations that were applied, for which there will be a pair of vectors ($f_i$, $t_i$) and some measure of the impact, which risk score estimator 506 could obtain from the network operators directly (e.g., through some rating) and/or derive it from some heuristic on the network telemetry (e.g., by checking whether TCP connections were interrupted, looking at potential disconnections, CPU load, etc.).

In further embodiments, risk score estimator 506 may also take into account whether there is a deterministic impact to applying the configuration change. Some recommendations might lead to user sessions being reset, for instance. Even if the recommendation is correct and everything goes according to plan, there might still be impact to the user experience due to rolling out the change (some routers/Operating system support the ability to update with Non-Stop Forwarding (NSF)).

In additional embodiments, risk score estimator 506 may take into account how much of the network traffic is dependent on the network devices that are impacted by the recommendation and the corresponding configuration change(s). For instance, a datacenter router might act as a bottleneck to a lot of service traffic. Yet another example the number of users/flows impacted by the change is a critical variable.

Risk score estimator 506 may also estimate the number of user sessions that would be affected by certain interfaces or routers going down at a certain point in time. To do so, risk score estimator 506 may first obtain historical data about user sessions for each supported application, and the network endpoints involved in the corresponding flows, from the client to the WAN or internal server. In SD-WAN networks, this can be achieved by collecting flow data through built-in controller data collection mechanisms. In other networks, dedicated flow collectors can be used. For each user session, risk score estimator 506 may set a weight based on the criticality of the application, as well as the rough characteristics of the session (e.g., number of bytes exchanges, even though that is only a very partial view). Next, risk score estimator 506 may then estimate the impact the recommendation, or set of recommendations, has if everything goes as planned and also if something goes wrong, and the corresponding interfaces suffer an outage.

In one embodiment, risk score estimator 506 may compute graph centrality indices for the affected network devices. Although very rough and imprecise, it can give a high-level idea of whether an outage relating to the scope of the recommendation(s) would lead to lots of bottleneck or can be worked around easily. This can be done as follows:

Risk score estimator 506 may define a graph G=(V, E) where nodes are network devices, and directed edges connect network interfaces where traffic can flow. Risk score estimator 506 may also add a specific node for the public Internet.

Edges in E have a weight set based the historical amount of flow observed over the edge, as measured for example by user sessions weighted by application criticality computed in the previous step.

Risk score estimator 506 may also compute a centrality index for the network devices affected by the recommendations. For instance, betweenness centrality can be used.

Risk score estimator 506 may then compute the score by aggregating the centrality indexes into a single value (e.g., by taking a percentile if there are enough network devices, or a simple average).

In another embodiment, risk score estimator 506 may use a what-if scenario statistical model to compute its risk scores. These provide a more in-depth modeling of the network entities and flows. Such a model may, for instance, comprise a generative machine learning model to estimate what would happen in a possibly not-yet-observed situation by extrapolating from previously observed states. If the model produces a prediction with sufficient confidence, risk score estimator 506 may compute the score based on the amount of flow or user sessions that would be disrupted in the simulated scenario. If the prediction of the model has high uncertainty (e.g., maybe the situation is too far from anything ever observed for the model to yield a sufficiently certain prediction), risk score estimator 506 could also fall back to using other approaches, such as the flow feasibility problem mentioned above.

In some embodiments, the risk scores computed by risk score estimator 506 may also depend on the time horizon during which their corresponding recommendations would be applied. For instance, the amount of potentially disrupted traffic depends on when the change would be made. For a local business over a single time zone, applying recommendations during low-traffic time periods may limit that component of the risk and be preferable to applying the recommendations in the middle of the day. Applying recommendations during low traffic periods is no guarantee that issues will not still occur later on when load increases, but it can provide more time to react. Hence, in one embodiment, risk score estimator 506 may compute risk scores for different rollout windows where a recommendation would be applied, to provide the user or automation system with information on how the risk varies. Those values are referred to herein as the risk time-profile. This allows a user to elect to apply the recommendation during a lower risk time period.

Figure 9:
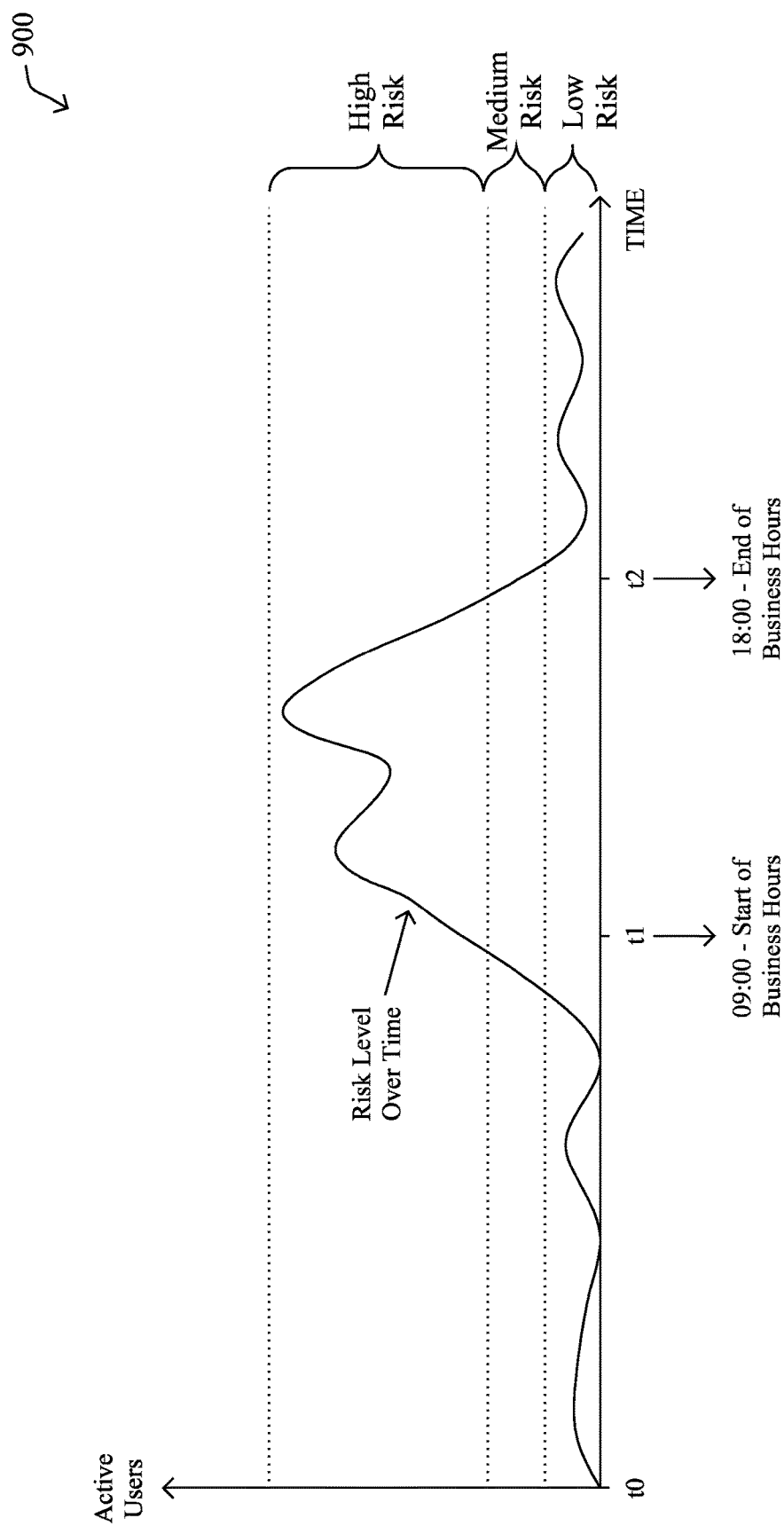
FIG. 9 illustrates an example plot of the risk associated with a recommendation.

FIG. 9 illustrates an example plot 900 of the risk associated with a recommendation over time. As shown, the risk goes up significantly during a specific time period corresponding to normal business hours. Outside of those hours, though, the risk score decreases significantly.

Of course, in global networks, different time zones and business patterns, risk profiles may be more complex. Risk profiles are also driven not just by human users, but also by automated processes and systems running over the network (e.g., backups, business applications, etc.).

By providing the risk score and/or risk time-profile to a user interface for each recommendation or group of recommendation (e.g., as grouped by recommendation grouping module 504), the user can then opt to implement the recommendation(s) at a time when the risk is lower. In cases in which recommendations are automatically implemented without first requiring explicit user feedback, the system could similarly use the risk score and/or risk time-profile information to decide whether to implement a recommendation (and when).

Figure 10:
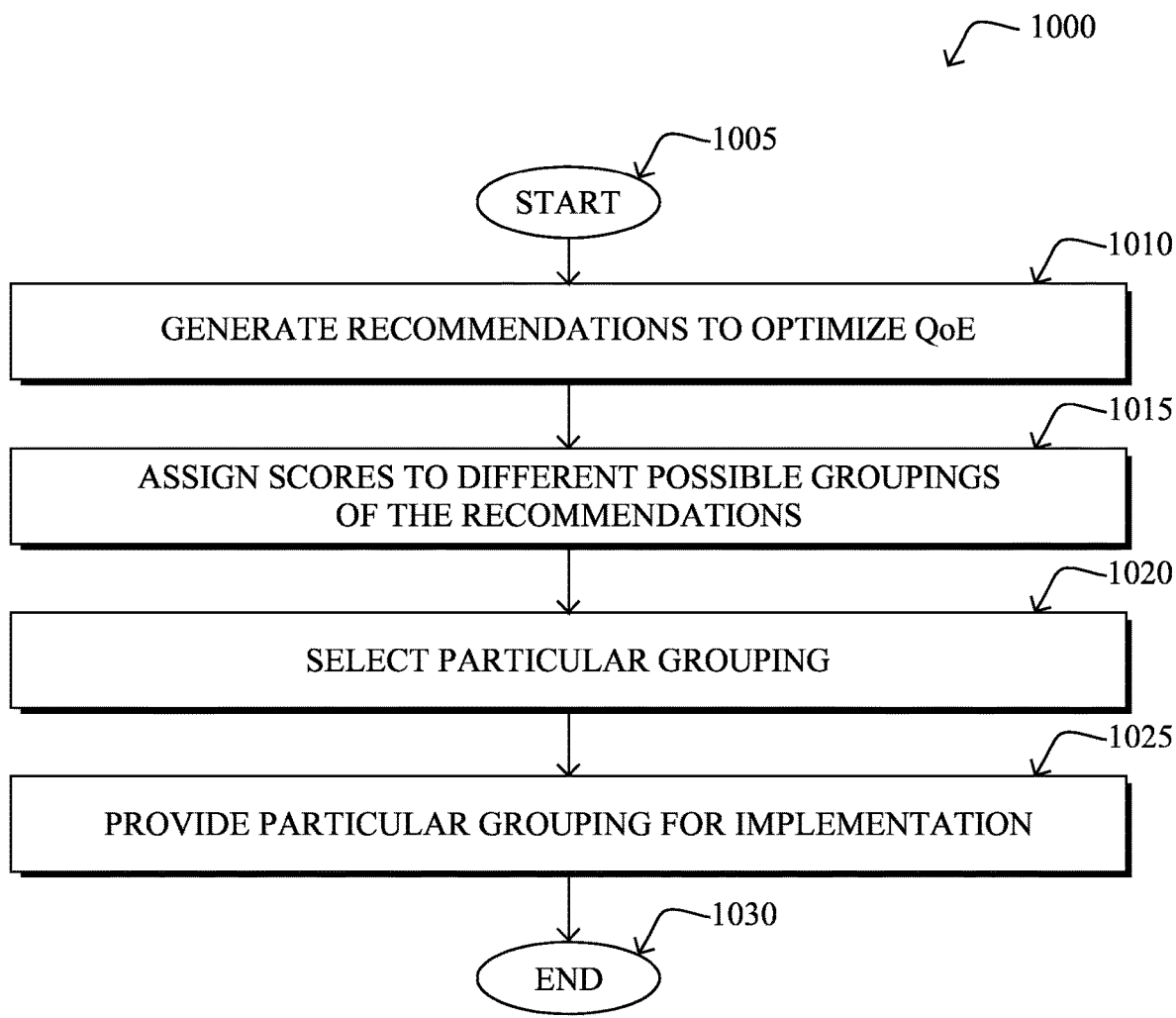
FIG. 10 illustrates an example simplified procedure for recommendation grouping for predictive networking.

FIG. 10 illustrates an example simplified procedure 1000 (e.g., a method) procedure for recommendation grouping for predictive networking, in accordance with one or more embodiments described herein. For example, a non-generic, specifically configured device (e.g., device 200), such as controller for a network (e.g., an SDN controller or other device in communication therewith), may perform procedure 1000 by executing stored instructions (e.g., recommendation policy manager process 249 in conjunction with predictive networking process 248). The procedure 1000 may start at step 1005, and continues to step 1010, where, as described in greater detail above, the device may generate a plurality of recommendations for a network, each recommendation indicating a suggested action to optimize quality of experience of a corresponding application accessible via the network.

At step 1015, as detailed above, the device may assign scores to different possible groupings of the plurality of recommendations.

At step 1020, the device may select a particular grouping from among the plurality of recommendations, based on their scores, as described in greater detail above. In various embodiments, the particular grouping comprises a merging or generalization of two or more recommendations of the plurality of recommendations. In some embodiments, the two or more recommendations are associated with different applications. In a further embodiment, the particular grouping comprises recommendations associated with a common site in the network. In another embodiment, the particular grouping comprises recommendations associated with a common action.

At step 1025, as detailed above, the device may provide the particular grouping for implementation in the network. In one embodiment, the device provides the particular grouping to a user interface for display. In another embodiment, the device provides the particular grouping to a controller for the network. In some embodiments, the device may delay providing the particular grouping based on a forecasting horizon associated with the plurality of recommendations. In further embodiments, the device may also compute a risk score for the particular grouping that represents a degree of risk of the particular grouping negatively impacting the network, if implemented, and provide the risk score in conjunction with the particular grouping. In one embodiment, the risk score is associated with a time window during which the particular grouping may be implemented in the network.

Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for recommendation grouping for predictive networking and computing risk scores for such recommendations, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
generating, by a device, a plurality of recommendations for a network, each recommendation indicating a suggested action to optimize quality of experience of a corresponding application accessible via the network;
assigning, by the device, scores to different possible groupings of the plurality of recommendations, wherein each score for a respective grouping characterizes a relationship between pre-implementation and projected post-implementation amounts of policies and policy terms in a network policy configuration;
selecting, by the device, a particular grouping from among the plurality of recommendations, based on their scores; and
providing, by the device, the particular grouping for implementation in the network.

2. The method as in claim 1, wherein the device provides the particular grouping to a user interface for display.

3. The method as in claim 1, wherein the device provides the particular grouping to a controller for the network.

4. The method as in claim 1, wherein the particular grouping comprises a merging or generalization of two or more recommendations of the plurality of recommendations.

5. The method as in claim 4, wherein the two or more recommendations are associated with different applications.

6. The method as in claim 1, further comprising:
delaying providing the particular grouping based on a forecasting horizon associated with the plurality of recommendations.

7. The method as in claim 1, further comprising:
computing a risk score for the particular grouping that represents a degree of risk of the particular grouping negatively impacting the network if implemented; and providing the risk score in conjunction with the particular grouping.

8. The method as in claim 7, wherein the risk score is associated with a time window during which the particular grouping may be implemented in the network.

9. The method as in claim 1, wherein the particular grouping comprises recommendations associated with a common site in the network.

10. The method as in claim 1, wherein the particular grouping comprises recommendations associated with a common action.

11. An apparatus, comprising:
one or more network interfaces;
a processor coupled to the one or more network interfaces and configured to execute one or more processes; and
a memory configured to store a process that is executable by the processor, the process when executed configured to:
generate a plurality of recommendations for a network, each recommendation indicating a suggested action to optimize quality of experience of a corresponding application accessible via the network;
assign scores to different possible groupings of the plurality of recommendations, wherein each score for a respective grouping characterizes a relationship between pre-implementation and projected post-implementation amounts of policies and policy terms in a network policy configuration;
select a particular grouping from among the plurality of recommendations, based on their scores; and
provide the particular grouping for implementation in the network.

12. The apparatus as in claim 11, wherein the apparatus provides the particular grouping to a user interface for display.

13. The apparatus as in claim 11, wherein the apparatus provides the particular grouping to a controller for the network.

14. The apparatus as in claim 11, wherein the particular grouping comprises a merging or generalization of two or more recommendations of the plurality of recommendations.

15. The apparatus as in claim 14, wherein the two or more recommendations are associated with different applications.

16. The apparatus as in claim 11, wherein the process when executed is further configured to:
delay providing the particular grouping based on a forecasting horizon associated with the plurality of recommendations.

17. The apparatus as in claim 11, wherein the process when executed is further configured to:
compute a risk score for the particular grouping that represents a degree of risk of the particular grouping negatively impacting the network if implemented; and
provide the risk score in conjunction with the particular grouping.

18. The apparatus as in claim 17, wherein the risk score is associated with a time window during which the particular grouping may be implemented in the network.

19. The apparatus as in claim 11, wherein the particular grouping comprises recommendations associated with a common site in the network.

20. A tangible, non-transitory, computer-readable medium storing program instructions that cause a device to execute a process comprising:
generating, by the device, a plurality of recommendations for a network, each recommendation indicating a suggested action to optimize quality of experience of a corresponding application accessible via the network;
assigning, by the device, scores to different possible groupings of the plurality of recommendations, wherein each score for a respective grouping characterizes a relationship between pre-implementation and projected post-implementation amounts of policies and policy terms in a network policy configuration;
selecting, by the device, a particular grouping from among the plurality of recommendations, based on their scores; and
providing, by the device, the particular grouping for implementation in the network.

\* \* \* \* \*